Patented June 6, 1944

2,350,850

UNITED STATES PATENT OFFICE 2,350,850

PROCESS FOR THE PRODUCTION OF NITROGEN-PHOSPHORIC ACID COMPOUNDS

Rudolf Watzel, Mannheim, Germany; vested in the Alien Property Custodian

No Drawing. Application March 13, 1942, Serial No. 434,623. In Germany March 26, 1941

5 Claims. (Cl. 23—106)

This invention relates to a process for the production of nitrogen-phosphoric acid compounds having water-softening qualities.

It has already been endeavoured heretofore to produce similar compounds by starting from gaseous ammonia and solid phosphorus pentoxide. Apart from the fact that this process offers technical difficulties in its application, it has the disadvantage that the reaction occurring in connection therewith takes place partly non-uniformly and partly incompletely, resulting in producing various products of varying composition and very slight yield. Besides, the products thus obtained further contain impurities consisting of by-products and unaltered initial material, smelling in aqueous solution strongly of phosphoretted hydrogen.

Now the surprising discovery has been made that homogeneous nitrogen-phosphoric acid compounds of high yield are obtained by reacting urea with such phosphoric acids which have a lower proportion of water molecules than orthophosphoric acid, under heating, and adding to the resulting compound hydrogen peroxide, whereupon an extremely stable, solid product is obtained. These products are of special importance, since they have, in addition to their water-softening and washing-activating properties, the ability of ceding their oxygen in aqueous liquors but gradually and bleaching the treated goods. The possibility of producing the compounds according to the present invention is particularly surprising as the reaction products from phosphoric acids and nitrogen compounds are—contrary to phosphoric salts which, too, form percompounds—amorphous, non-crystallized compounds.

Example 1.—105 g. of a reaction product, obtained by thoroughly mixing 86 g. of an anhydrous phosphoric acid, the $P_2O_5$-content of which amounts to 82.5 to 83%, with 60 g. of urea under slowly heating to 150° C., are intensively stirred with 60 ccm. of 33% hydrogen peroxide and then dried at a temperature of about 40° C., eventually at the application of vacuum. In this way a white, easy-pulverizable mass, containing 6.5 to 7% of active oxygen, is obtained. This compound having a $P_2O_5$-content of 44 to 45%, if employed in the amount of 15 g. per 100 litres and 1 degree of German hardness, is able to link the metal ions of the alkaline earths in the water into complex state and to bleach textile fibres. By variation of the proportions and working conditions, products with a different content of active oxygen or $P_2O_5$ respectively can be manufactured.

Example 2.—Equal weight parts of a reaction product, obtained by intensively stirring 86 g. of an anhydrous phosphoric acid, the $P_2O_5$-content of which amounts to 82.5 to 83%, with 60 g. of urea under slowly heating to 150° C., and sodium percarbonate are mixed and stirred with little water. The resulting compound is dried at about 30 to 40° C., eventually at the application of vacuum. A white powder with 5% of active oxygen is obtained.

What I claim is:

1. A process for the production of nitrogen-phosphoric acid compounds which comprises reacting concentrated anhydrous phosphoric acids with urea, slowly heating the reaction mixture to a temperature of about 150° C., adding hydrogen peroxide to the mixture and thoroughly mixing therewith, and then concentrating to dryness at a temperature of about 40° C. under partial vacuum.

2. A process for the production of nitrogen-phosphoric acid compounds which comprises reacting phosphoric acids having a lower proportion of water molecules than orthophosphoric acid with urea, slowly heating the reaction mixture to a temperature of about 150° C., adding hydrogen peroxide to the mixture and thoroughly mixing therewith, and then concentrating to dryness at a temperature of about 40° C. under partial vacuum.

3. A process for the production of nitrogen-phosphoric acid compounds which comprises reacting concentrated anhydrous phosphoric acids with urea, slowly heating the reaction mixture to a temperature of about 150° C., adding hydrogen peroxide to the mixture and thoroughly mixing therewith, and then drying at a temperature of about 40° C.

4. A process for the production of nitrogen-phosphoric acid compounds which comprises reacting phosphoric acids having a lower proportion of water molecules than orthophosphoric acid with urea, slowly heating the reaction mixture to a temperature of about 150° C., adding hydrogen peroxide to the mixture and thoroughly mixing therewith, and then drying at a temperature of about 40° C.

5. A process according to claim 1 characterized by the fact that instead of hydrogen peroxide a persalt with a small amount of water to yield hydrogen peroxide is employed.

RUDOLF WATZEL.